C. B. WOOD.
SIDE-BAR WAGON.

No. 171,903. Patented Jan. 4, 1876.

WITNESSES
Henry N. Miller
Franck L. Durand

INVENTOR
Charles B. Wood
By Alexander Mason
Attorneys.

UNITED STATES PATENT OFFICE.

CHARLES B. WOOD, OF BRIDGEPORT, CONNECTICUT.

IMPROVEMENT IN SIDE-BAR WAGONS.

Specification forming part of Letters Patent No. 171,903, dated January 4, 1876; application filed October 21, 1875.

*To all whom it may concern:*

Be it known that I, CHARLES B. WOOD, of Bridgeport, in the county of Fairfield and in the State of Connecticut, have invented certain new and useful Improvements in Device for Connecting Vehicle-Springs to Spring-Bars; and do hereby declare that the following is a full, clear, and exact description thereof, reference being had to the accompanying drawings, and to the letters of reference marked thereon, making a part of this specification.

My invention relates to side-bar vehicles; and consists in combining with the spring-bar, having a depending clip, a packing-ring, and flanged tube therein, with the vehicle-spring, having a bifurcated end, and connecting the parts by a bolt and nut, all as hereinafter more fully set forth.

Figure 1:
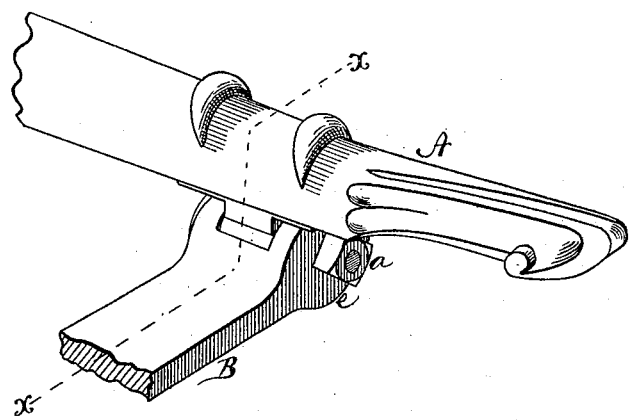
Figure 2:
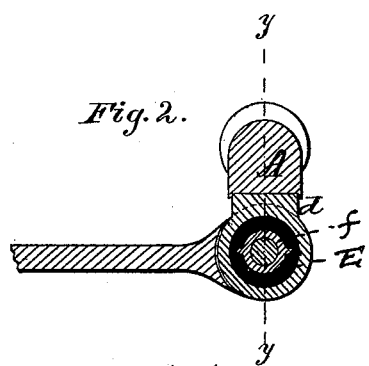
Figure 3:
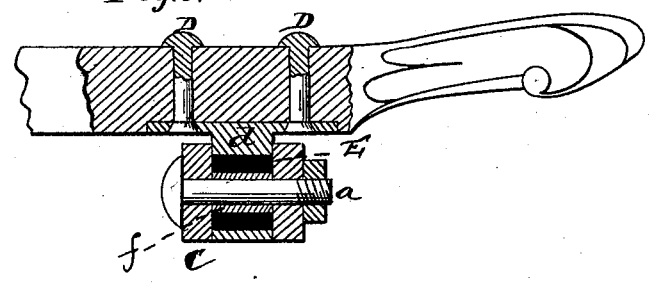

In the annexed drawing, making part of this specification, Figure 1 represents a perspective view of the end of a spring-bar and the end of a spring, the two being connected together. Fig. 2 represents a cross-section, and Fig. 3 the portion of a longitudinal section.

In the figures, A represents a portion of a side or spring bar of a vehicle, and B a portion of one of the half-elliptic springs which is used with it. The spring-bar is made in the usual manner; but the end of the spring, it will be seen, is swelled and rounded, and then divided, so that the two arms of the divided end will embrace the depending portion of the clip, to which it is to be connected. $d$ represents the clip, which may be secured to the spring-bar by loops or bolts D D, or in other suitable manner. The depending portion of the clip, which is under the bar, is rounded, and made so that it will fit snugly between the two arms of the end of the spring. Fitted within the opening in this rounded part of the clip is an india-rubber or leather ring, E, having a central opening, into which is placed a short metal tube with exterior flanges, to prevent the same from turning in its place. A bolt, $a$, passes through the arms of the spring and through the tube F, to secure the same together. By thus connecting the parts the rubber packing prevents the lateral movement of the spring from being too free, and at the same time forms an anti-rattler. Whenever the tube $f$ becomes warm it can be readily detached and a new one substituted without necessitating the employment of a new clip.

The object of this invention is to prevent strain upon the connection of the spring and the bar when the vehicle has occasion to pass over rough places or is heavily loaded. The two parts being securely hinged together, as seen, the clip is allowed to oscillate, so that the spring-bar may move slightly outward and inward on a line with the elliptic spring sufficiently to prevent any strain of the connection, as is the case when the parts are secured together rigidly by bolts or otherwise.

I am aware that the broad idea of a rolling joint between the side bar and vehicle-spring is not new; hence I do not claim such as being my invention.

Having thus fully described my invention, what I claim as new, and desire to secure by Letters Patent, is—

The combination of the spring-bar A, the depending clip $d$, the packing-ring E, flanged tube $f$, bifurcated spring B, and the bolt and nut $a$, all constructed substantially as and for the purposes set forth.

In testimony that I claim the foregoing I have hereunto set my hand this 15th day of October, 1875.

CHAS B. WOOD.

Witnesses:
 ENOCH P. HINKS,
 W. SMITH.